April 25, 1939.  G. P. BERRY  2,155,855
VALVE LUBRICATION
Filed May 10, 1937
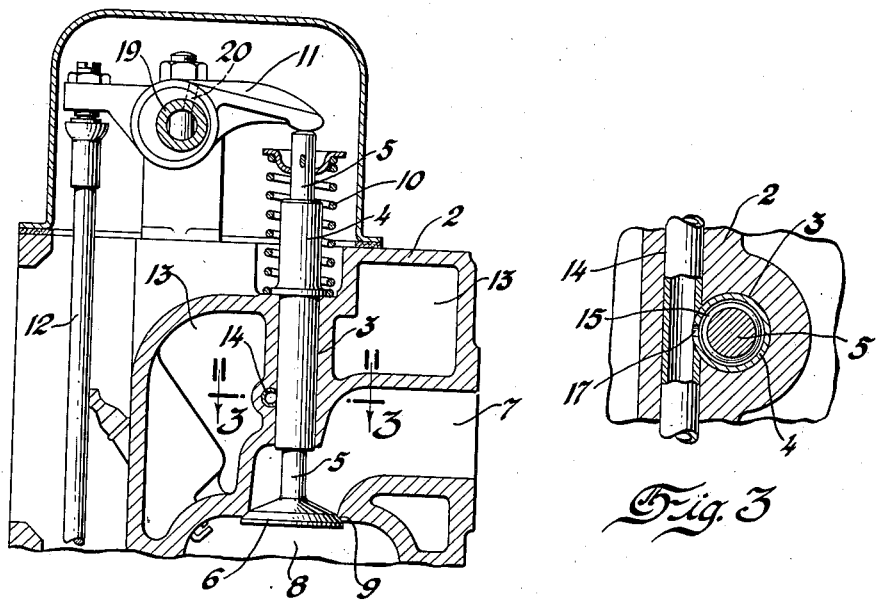
Fig. 1
Fig. 3
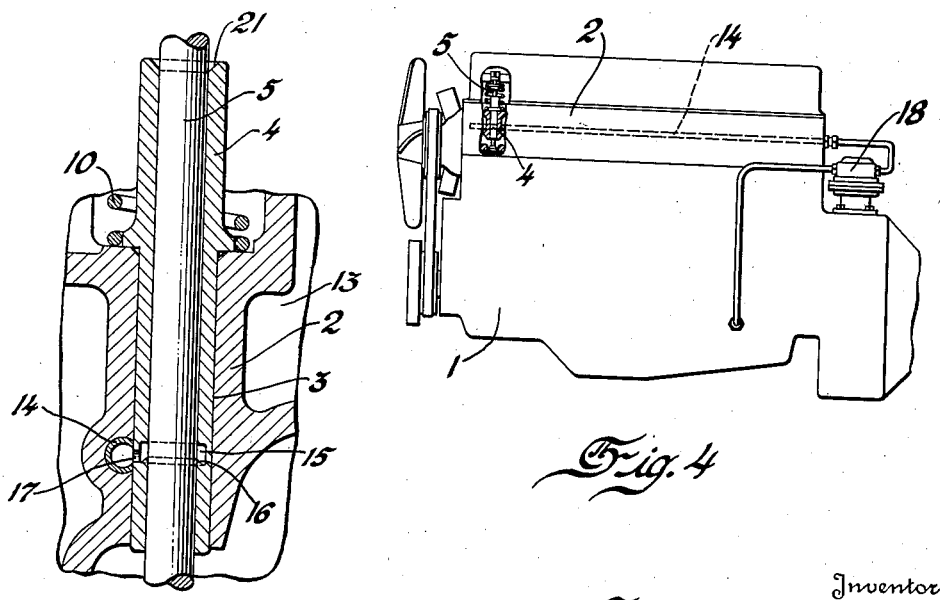
Fig. 2
Fig. 4
Inventor
George P. Betty
By Blackmore, Spencer & Flint
Attorneys Patented Apr. 25, 1939

2,155,855

UNITED STATES PATENT OFFICE 2,155,855

VALVE LUBRICATION

George P. Berry, Detroit, Mich., assignor to General Motors Corporation, Detroit, Mich., a corporation of Delaware Application May 10, 1937, Serial No. 141,593

1 Claim. (Cl. 184—6)

This invention relates to valves and more specifically to the overhead poppet valves of an internal combustion engine and their lubrication.

It is desirable to provide adequate lubrication for the stems of the valves of an internal combustion engine to prevent wear and sticking of the valve stems in their guides. On the other hand, if lubricating oil reaches any portion of the valve stem that is hot enough to carbonize it, sticking may occur. The exhaust valve, which is more exposed to the heat of the hot products of combustion than the inlet valve, is especially liable to stick in this way.

The object of the invention is to provide for effective lubrication of the valve stems, without permitting the lubricating oil to pass on to those portions thereof exposed to the heat of the combustion chamber.

Another object of the invention is to provide means for drawing or exhausting lubricating oil away from the valve stems after it has performed its useful function in lubricating the stems.

The above and other objects of the invention will be apparent as the description proceeds.

According to the invention, the overhead valve gear of an internal combustion engine is flooded with lubricating oil in known manner, and this provides for ample lubrication of the valve stems sufficient to prevent wear, to lower the valve temperature, to lessen the noise of operation and to prevent the valves from sticking in their guides. Alternatively, oil under pressure may be supplied directly to the valve stems and their guides. In any case the oil is removed from each valve stem at a point remote from its point of supply, after it has performed its useful function in lubricating the stem, and before it can reach the hot portions of the valve stem where the oil would be carbonized.

The drawing shows one example of a construction according to the invention.

In the drawing:

Fig. 1 is a vertical section through the cylinder head of an internal combustion engine, showing one valve and a part of its operating gear.

Fig. 2 is an enlarged sectional view of a part of Fig. 1.

Fig. 3 is an enlarged sectional view on line 3—3 of Fig. 1.

Fig. 4 shows one way in which a conduit common to all the valves may be connected to a source of vacuum, to return the oil scavenged from the lower part of the valve stems to the oil sump in the crank chamber.

The engine frame 1 includes a cylinder head 2 having a bore 3 for a valve guide 4. Slidable within the guide 4 is the stem 5 of a poppet valve 6 controlling the opening of a port 7 to the combustion chamber 8.

The valve 6 is held on its seating 9 by a spring 10, and is opened against the pressure of spring 10 by the rocker arm 11, through the medium of the push rod 12 actuated by cam means (not shown).

Water cooling spaces 13 are provided in the cylinder head 2.

A tubular conduit 14 is cast within the cylinder head, in a position such that it will intersect the bore 3 for the valve guide 4, preferably towards that end thereof adjacent to the head 6 of the valve and the hot uncooled portion of the valve stem 5.

As the bore 3 is machined, a part of the side wall of the conduit will be machined away as shown most clearly in Figs. 2 and 3, putting the bore 3 in communication with the bore of the tubular conduit 14.

Within the bore of the valve guide 4, towards that end thereof adjacent to the head 6 of the valve and the hot uncooled portion of the valve stem 5, is an annular groove 15.

The edge of the annular groove 15, nearest to the head 6 of the valve, is undercut to provide an acute angled scraping edge 16, which will assist in removing oil from the valve stem on the opening movement thereof.

The valve guide 4 closes off communication between the bore 3 and the bore of the tubular conduit 14, but a hole 17 between the outside of the valve guide 4 and the annular groove 15, puts the annular groove in communication with the bore of the tubular conduit 14.

The valve gear of the engine may be flooded with oil providing ample lubrication for the valve stems. It may be delivered in known manner from the tubular rocker arm shaft 19 through ducts such as 20. The top edge of the bore through the valve guide 4 is chamfered at 21 to provide a small annular reservoir with an obtuse angled edge to assist the oil to find its way down the valve stem. That oil which finds its way down the valve stems is removed therefrom, at a point remote from its point of supply thereto, by the edge 16 of the annular groove 15, before it can reach the hotter portion of the valve stem where it would otherwise carbonize and cause sticking of the valve. The oil is continuously removed from the annular groove 15 through the tubular conduit 14.

The conduit 14 is preferably connected to a source of depression which may be an exhaust pump 18 returning the lubricating oil to the sump in the engine crank chamber as shown in Fig. 4.

It will be appreciated that while only one valve has been illustrated in the drawing, the annular grooves in the valve guides of any number of valves may be connected to the same tubular conduit, and Fig. 4 indicates the manner in which this would be effected in an engine with cylinders in line.

It will be apparent that the arrangement effectively provides for ample lubrication to reduce wear, to lower the valve temperature, to quieten the valves, and prevents valve sticking which might otherwise arise from too little or too great a quantity of oil reaching the hotter part of the valve stem.

I claim:

In an internal combustion engine, in combination, a combustion chamber, a valve therefor, said valve having a stem slidable in a valve guide, means whereby lubricating oil is supplied to the valve guide bearing surface, and means whereby lubricating oil passing along the stem of the valve is prevented from reaching that portion of the valve which is heated by the hot products of combustion and recovered and returned to the engine sump, said last named means including an annular groove in the bore of the valve guide, and a return conduit in communication with the annular groove, that edge of the annular groove in the bore of the valve guide nearest to the head of the valve being undercut to provide an acute angled scraping edge.

GEORGE P. BERRY.